(12) United States Patent
Nakano et al.

(10) Patent No.: US 11,846,754 B2
(45) Date of Patent: Dec. 19, 2023

(54) OPTICAL LENS WITH ANTIREFLECTIVE FILM, PROJECTION LENS, AND PROJECTION LENS OPTICAL SYSTEM

(71) Applicant: Konica Minolta, Inc., Tokyo (JP)

(72) Inventors: Yoshihiro Nakano, Tondabayashi (JP); Koji Takahara, Hirakata (JP)

(73) Assignee: Konica Minolta, Inc., Tokyo (JP)

( * ) Notice: Subject to any disclaimer, the term of this patent is extended or adjusted under 35 U.S.C. 154(b) by 565 days.

(21) Appl. No.: 17/127,332

(22) Filed: Dec. 18, 2020

(65) Prior Publication Data
US 2021/0199854 A1 Jul. 1, 2021

(30) Foreign Application Priority Data

Dec. 25, 2019 (JP) ................. 2019-234862

(51) Int. Cl.
| | | |
|---|---|---|
| *C01F 5/28* | (2006.01) | |
| *C01G 23/00* | (2006.01) | |
| *C01G 23/047* | (2006.01) | |
| *C01G 25/00* | (2006.01) | |
| *C01G 33/00* | (2006.01) | |
| *C01G 35/00* | (2006.01) | |
| *C03C 17/34* | (2006.01) | |
| *G02B 15/167* | (2006.01) | |
| *G02B 1/115* | (2015.01) | |

(52) U.S. Cl.
CPC ............... *G02B 1/115* (2013.01); *C01F 5/28* (2013.01); *C01G 23/003* (2013.01); *C01G 23/047* (2013.01); *C01G 25/006* (2013.01); *C01G 33/00* (2013.01); *C01G 35/00* (2013.01); *C03C 17/3452* (2013.01); *G02B 15/167* (2013.01); *C03C 2217/213* (2013.01); *C03C 2217/218* (2013.01); *C03C 2217/285* (2013.01); *C03C 2217/734* (2013.01); *C03C 2218/152* (2013.01)

(58) Field of Classification Search
CPC ............ G02B 1/115; C03C 2117/213; C03C 2117/218; C03C 2117/285; C03C 2117/734; C03C 2218/152
USPC ................................................. 359/601
See application file for complete search history.

(56) References Cited

FOREIGN PATENT DOCUMENTS

| | | |
|---|---|---|
| CN | 109112479 A | 1/2019 |
| CN | 109154679 A | 1/2019 |
| JP | S50033212 A | 3/1975 |

(Continued)

OTHER PUBLICATIONS

Office Action issued in corresponding Chinese Application No. 202011515509.1 dated Nov. 2, 2022 (13 pages).

(Continued)

*Primary Examiner* — Jerry L Brooks
(74) *Attorney, Agent, or Firm* — Osha Bergman Watanabe & Burton LLP

(57) ABSTRACT

An optical lens with an antireflective film includes: a lens substrate; and an antireflective film disposed on the lens substrate. The antireflective film is formed of layers each having a physical thickness of 140 nm or less. In order from an air side, the antireflective film has: a first layer formed as an $MgF_2$ layer, a second layer, a fourth layer, a sixth layer, an eighth layer, and a tenth layer each having a refractive index of 2.0 or more and 2.3 or less, and a third layer, a fifth layer, a seventh layer, and a ninth layer each formed as an $SiO_2$ layer.

6 Claims, 10 Drawing Sheets

(56) References Cited

FOREIGN PATENT DOCUMENTS

| WO | 2017204127 A1 | 11/2017 | |
|---|---|---|---|
| WO | WO-2017204127 A1 * | 11/2017 | ......... C03C 17/3423 |

OTHER PUBLICATIONS

Office Action issued in corresponding Chinese Patent Application No. 202011515509.1, dated Mar. 2, 2022 (18 pages).
Office Action in corresponding Japanese Application No. 2019-234862, dated May 9, 2023 (9 pages).

* cited by examiner

OPTICAL LENS WITH ANTIREFLECTIVE FILM, PROJECTION LENS, AND PROJECTION LENS OPTICAL SYSTEM

The entire disclosure of Japanese Patent Application No. 2019-234862, filed on Dec. 25, 2019, is incorporated herein by reference in its entirety.

TECHNOLOGICAL FIELD

The present disclosure relates to an optical lens with an antireflective film, a projection lens, and a projection lens optical system.

BACKGROUND

In recent years, imaging performance required for a projection lens optical system has been increasing as the number of pixels of an image increases. In order to improve the imaging performance of the projection lens optical system, the number of projection lenses forming this projection lens optical system tends to increase. As the number of projection lenses increases, the light transmittance of the projection lens optical system decreases. WO2017/204127 discloses that an antireflective film is formed on a projection lens in order to increase the light transmittance of a projection lens optical system. The antireflective film disclosed in WO2017/204127, however, leads to a larger variation in reflection spectrum of an antireflective film in each production lot.

SUMMARY

One or more embodiments of the present invention provide an optical lens with an antireflective film, a projection lens, and a projection lens optical system, by which the reflectance of an antireflective film in a wavelength range of 430 nm or more and 670 nm or less can be lowered while the variations in reflection spectrum of the antireflective film among production lots can be reduced.

According to one or more embodiments of the present invention, an optical lens with an antireflective film comprises: a lens substrate; and an antireflective film formed on the lens substrate. The antireflective film is formed of at least ten layers. Each of the layers forming the antireflective film has a physical thickness of 140 nm or less. In order from an air side, the antireflective film has a first layer formed as an $MgF_2$ layer. In order from the air side, the antireflective film has a second layer, a fourth layer, a sixth layer, an eighth layer, and a tenth layer each having a refractive index of 2.0 or more and 2.3 or less. In order from the air side, the antireflective film has a third layer, a fifth layer, a seventh layer, and a ninth layer each formed as an $SiO_2$ layer. Quarter wave optical thicknesses $Q_1$, $Q_2$, $Q_3$, $Q_4$, $Q_5$, $Q_6$, $Q_7$, $Q_8$, $Q_9$, and $Q_{10}$ of the first, second, third, fourth, fifth, sixth, seventh, eighth, ninth, and tenth layers, respectively, in a design reference wavelength of 550 nm satisfy the following equations (1), (2), (3), (4), (5), (6), (7), (8), (9), and (10), respectively:

$$Q_1 = 0.05 \times n_s + A1 \, (0.79 \leq A1 \leq 0.91); \quad \text{Equation (1)}$$

$$Q_2 = 0.09 \times n_s + A2 \, (1.64 \leq A2 \leq 1.85); \quad \text{Equation (2)}$$

$$Q_3 = A3 \, (0.68 \leq A3 \leq 1.02); \quad \text{Equation (3)}$$

$$Q_4 = A4 \, (0.02 \leq A4 \leq 0.22); \quad \text{Equation (4)}$$

$$Q_5 = A5 \, (0.68 \leq A5 \leq 1.02); \quad \text{Equation (5)}$$

$$Q_6 = -0.31 \times n_s + A6 \, (1.01 \leq A6 \leq 1.29); \quad \text{Equation (6)}$$

$$Q_7 = A7 \, (0.10 \leq A7 \leq 0.35); \quad \text{Equation (7)}$$

$$Q_8 = 0.79 \times n_s + A8 \, (-1.64 \leq A8 \leq 0.01); \quad \text{Equation (8)}$$

$$Q_9 = -0.64 \times n_s + A9 \, (1.26 \leq A9 \leq 1.55); \text{ and} \quad \text{Equation (9)}$$

$$Q_{10} = 0.32 \times n_s + A10 \, (-0.38 \leq A10 \leq 0.19). \quad \text{Equation (10)}$$

In this case, $n_s$ shows a refractive index of the lens substrate in a wavelength of 587.56 nm. Each of the quarter wave optical thicknesses of the respective layers of the antireflective film in the design reference wavelength is obtained by dividing an optical thickness of each of the layers of the antireflective film by $\lambda_0/4$. The optical thickness of each of the layers of the antireflective film is obtained by a product of: the refractive index of each of the layers of the antireflective film in the design reference wavelength and the physical thickness (nm) of each of the layers of the antireflective film.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION

Figure 1:
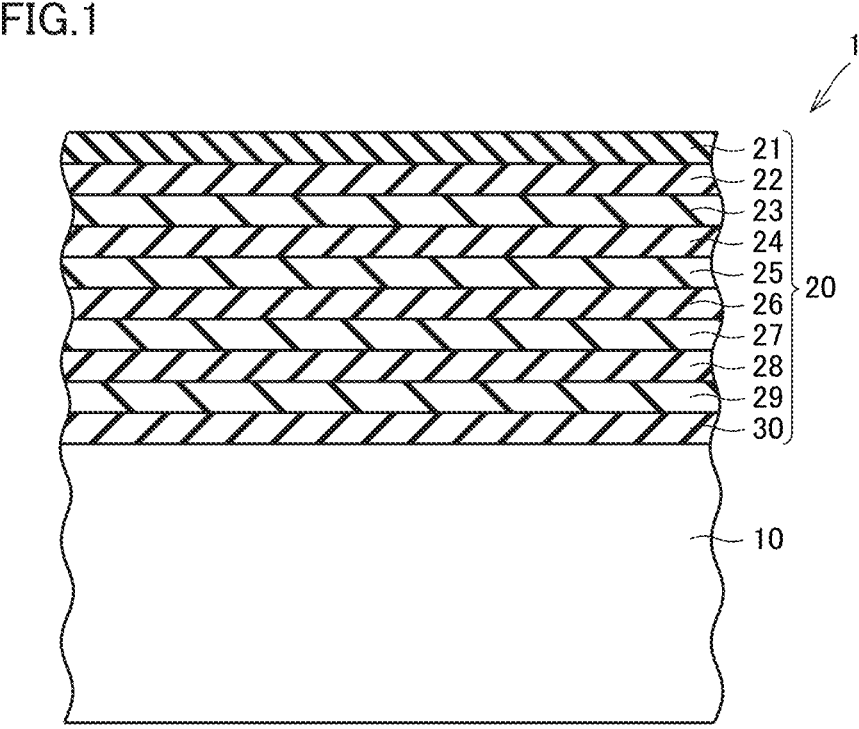
FIG. 1 is an enlarged partial cross-sectional view of an optical lens with an antireflective film in examples (Example 1 and Example 5) according to one or more embodiments.

Hereinafter, one or more embodiments of the present invention will be described with reference to the drawings. However, the scope of the invention is not limited to the disclosed embodiments.

Referring to the accompanying drawings, an optical lens with an antireflective film, a projection lens, and a projection lens optical system according to embodiments will be hereinafter described.

An optical lens with an antireflective film in one or more embodiments includes: a lens substrate; and an antireflective film formed on the lens substrate. The antireflective film is formed of at least ten layers. Each of the layers forming the antireflective film has a physical thickness of 140 nm or less. In order from an air side, the antireflective film has a first layer formed as an $MgF_2$ layer. In order from the air side, the antireflective film has a second layer, a fourth layer, a sixth layer, an eighth layer, and a tenth layer each having a refractive index of 2.0 or more and 2.3 or less. In order from the air side, the antireflective film has a third layer, a fifth layer, a seventh layer, and a ninth layer each formed as an $SiO_2$ layer. Quarter wave optical thicknesses $Q_1$, $Q_2$, $Q_3$, $Q_4$, $Q_5$, $Q_6$, $Q_7$, $Q_8$, $Q_9$, and $Q_{10}$ of the first, second, third, fourth, fifth, sixth, seventh, eighth, ninth, and tenth layers, respectively, in a design reference wavelength of 550 nm satisfy the following equations (1), (2), (3), (4), (5), (6), (7), (8), (9), and (10), respectively:

$$Q_1 = 0.05 \times n_s + A1 \; (0.79 \leq A1 \leq 0.91); \quad \text{Equation (1)}$$

$$Q_2 = 0.09 \times n_s + A2 \; (1.64 \leq A2 \leq 1.85); \quad \text{Equation (2)}$$

$$Q_3 = A3 \; (0.68 \leq A3 \leq 1.02); \quad \text{Equation (3)}$$

$$Q_4 = A4 \; (0.02 \leq A4 \leq 0.22); \quad \text{Equation (4)}$$

$$Q_5 = A5 \; (0.68 \leq A5 \leq 1.02); \quad \text{Equation (5)}$$

$$Q_6 = -0.31 \times n_s + A6 \; (1.01 \leq A6 \leq 1.29); \quad \text{Equation (6)}$$

$$Q_7 = A7 \; (0.10 \leq A7 \leq 0.35); \quad \text{Equation (7)}$$

$$Q_8 = 0.79 \times n_s + A8 \; (-1.64 \leq A8 \leq 0.01); \quad \text{Equation (8)}$$

$$Q_9 = -0.64 \times n_s + A9 \; (1.26 \leq A9 \leq 1.55); \text{ and} \quad \text{Equation (9)}$$

$$Q_{10} = 0.32 \times n_s + A10 \; (-0.38 \leq A10 \leq 0.19). \quad \text{Equation (10)}$$

In this case, $n_s$ shows a refractive index of the lens substrate in a wavelength of 587.56 nm (a d line). Each of the quarter wave optical thicknesses of the respective layers of the antireflective film in the design reference wavelength is obtained by dividing an optical thickness of each of the layers of the antireflective film by $\lambda_0/4$. The optical thickness of each of the layers of the antireflective film is obtained by a product of: the refractive index of each of the layers of the antireflective film in the design reference wavelength and the physical thickness (nm) of each of the layers of the antireflective film.

In this case, quarter wave optical thicknesses $Q_1$, $Q_2$, $Q_3$, $Q_4$, $Q_5$, $Q_6$, $Q_7$, $Q_8$, $Q_9$, and $Q_{10}$ satisfy the above-mentioned equations (1), (2), (3), (4), (5), (6), (7), (8), (9), and (10), respectively. Thus, the reflectance of the antireflective film in a wavelength range of 430 nm or more and 670 nm or less is lowered. Also, each of the layers forming the antireflective film has a physical thickness of 140 nm or less. As quarter wave optical thicknesses $Q_3$, $Q_4$, and $Q_5$ of the third, fourth and fifth layers of the antireflective film in a design reference wavelength satisfy the above-mentioned equations (3), (4), and (5), respectively, the thicknesses of the third, fourth, and fifth layers decrease. This reduces the variations in reflection spectrum of the antireflective film among production lots.

For example, each of the second, fourth, sixth, eighth, and tenth layers is a $Ta_2O_5$ layer, an $LaTiO_3$ layer, a layer formed of a mixture of $Ti_2O_3$ and $ZrO_2$, a layer formed of a mixture of $ZrTiO_4$ and $ZrO_2$, an $Nb_2O_5$ layer, or a $TiO_2$ layer. Thus, an antireflective film with less light loss may be formed by a vacuum deposition method performed, for example, at a relatively high temperature of 300° C.

For example, the maximum reflectance of the antireflective film in a wavelength range of 430 nm or more and 670 nm or less is 0.2% or less. Thereby, the reflectance of the antireflective film in a wavelength range of 430 nm or more and 670 nm or less is lowered. Thus, an optical lens with an antireflective film can be achieved that is applicable to a projection lens optical system in which the number of projection lenses tends to increase as the number of pixels of an image recently increases.

A projection lens in one or more embodiments is the optical lens with an antireflective film in one or more embodiments. This lowers the reflectance of the antireflective film in a wavelength range of 430 nm or more and 670 nm or less, and also reduces the variations in reflection spectrum of the antireflective film among production lots.

A projection lens optical system in one or more embodiments includes a plurality of the optical lenses each with an antireflective film in one or more embodiments. This lowers the reflectance of the antireflective film in a wavelength range of 430 nm or more and 670 nm or less, and also reduces the variations in reflection spectrum of the antireflective film among production lots. Thus, lowered light transmittance of the projection lens optical system may be suppressed. Also, the projection lens optical system in one or more embodiments can cope with an increase in number of projection lenses that form the projection lens optical system.

A projection lens optical system in one or more embodiments includes: a first projection lens that is the optical lens with an antireflective film in one or more embodiments; a second projection lens that is the optical lens with an antireflective film in one or more embodiments; and a third projection lens that is the optical lens with an antireflective film in one or more embodiments. A first refractive index of the lens substrate of the first projection lens, a second refractive index of the lens substrate of the second projection lens, and a third refractive index of the lens substrate of the third projection lens satisfy a first equation, a second equation, and a third equation, respectively. The first equation, the second equation, and the third equation are selected from equations (11), (12), (13), (14), (15), and (16) and different from each other:

$$1.35 \leq n_s < 1.45; \quad \text{Equation (11)}$$

$$1.45 \leq n_s < 1.55; \quad \text{Equation (12)}$$

$$1.55 \leq n_s < 1.65; \quad \text{Equation (13)}$$

$$1.65 \leq n_s < 1.75; \quad \text{Equation (14)}$$

$$1.75 \leq n_s < 1.85; \text{ and} \quad \text{Equation (15)}$$

$$1.85 \leq n_s < 1.95. \quad \text{Equation (16)}$$

The antireflective film in one or more embodiments allows lowered reflectance in a wavelength range of 430 nm or more and 670 nm or less for at least three types of lens substrates included in a projection lens optical system. At least three types of projection lenses including lens substrates made of different materials can be used for a projection lens optical system. Thus, the degree of freedom of the lens configuration of the projection lens optical system can be increased.

<Specific Configuration of Optical Lens 1 with Antireflective Film>

Referring to FIG. 1, an optical lens 1 with an antireflective film in an example in one or more embodiments will be hereinafter described. Optical lens 1 with an antireflective film includes a lens substrate 10 and an antireflective film 20 formed on lens substrate 10.

Lens substrate 10 is formed of a glass material such as BSC7, FCD100, or E-FDS1-W (each of which is manufactured by HOYA Corporation), for example.

Antireflective film 20 is formed of at least ten layers. In an example (see FIG. 1) in one or more embodiments, antireflective film 20 is formed of ten layers. Each of the layers forming antireflective film 20 has a physical thickness of 140 nm or less.

Specifically, in order from an air side, a first layer 21 of antireflective film 20 is an uppermost layer of antireflective film 20. First layer 21 of antireflective film 20 is a fluoride layer. First layer 21 of antireflective film 20 is an $MgF_2$ layer, for example. Also, $MgF_2$ has a high light transmittance and a low refractive index in a visible wavelength range of 430 nm or more and 670 nm or less. Thus, the first layer of the antireflective film that is closest to the air side is formed as an $MgF_2$ layer, thereby allowing lower optical absorptance and lower reflectance of the antireflective film in the visible wavelength range.

In order from the air side, each of a second layer 22, a fourth layer 24, a sixth layer 26, an eighth layer 28, and a tenth layer 30 of antireflective film 20 is a high refractive index layer having a refractive index of 2.0 or more and 2.3 or less in a design reference wavelength $\lambda_0$=550 nm. For example, each of second layer 22, fourth layer 24, sixth layer 26, eighth layer 28, and tenth layer 30 of antireflective film 20 is a $Ta_2O_5$ layer (a refractive index of 2.16), a $ZrO_2$ layer (a refractive index of 2.05), a layer formed of a mixture of $ZrTiO_4$ and $ZrO_2$ (a refractive index of 2.08), an $LaTiO_3$ layer (a refractive index of 2.1), a layer formed of a mixture of $ZrO_2$ and $TiO_2$ (a refractive index of 2.15), a layer formed of a mixture of $Ta_2O_5$ and $ZrO_2$ (a refractive index of 2.22), a layer formed of a mixture of $Ta_2O_5$ and $TiO_2$ (a refractive index of 2.24), an $Nb_2O_5$ layer (a refractive index of 2.3), or a $TiO_2$ layer (a refractive index of 2.3). In an example (see FIG. 1) in one or more embodiments, in order from the air side, tenth layer 30 of antireflective film 20 is in contact with lens substrate 10. Tenth layer 30 is a lowermost layer of antireflective film 20.

In order from the air side, each of a third layer 23, a fifth layer 25, a seventh layer 27, and a ninth layer 29 of antireflective film 20 is a low refractive index layer having a refractive index of 1.44 or more and 1.50 or less in design reference wavelength $\lambda_0$=550 nm. For example, each of third layer 23, fifth layer 25, seventh layer 27, and ninth layer 29 of antireflective film 20 is an $SiO_2$ layer.

Also, quarter wave optical thicknesses $Q_1$ to $Q_{10}$ of first layer 21 to tenth layer 30 in design reference wavelength $\lambda_0$ of 550 nm satisfy the following equations (1) to (10):

$$Q_1=0.05 \times n_s+A1 (0.79 \leq A1 \leq 0.91); \quad \text{Equation (1)}$$

$$Q_2=0.09 \times n_s+A2 (1.64 \leq A2 \leq 1.85); \quad \text{Equation (2)}$$

$$Q_3=A3 (0.68 \leq A3 \leq 1.02); \quad \text{Equation (3)}$$

$$Q_4=A4 (0.02 \leq A4 \leq 0.22); \quad \text{Equation (4)}$$

$$Q_5=A5 (0.68 \leq A5 \leq 1.02); \quad \text{Equation (5)}$$

$$Q_6=-0.31 \times n_s+A6 (1.01 \leq A6 \leq 1.29); \quad \text{Equation (6)}$$

$$Q_7=A7 (0.10 \leq A7 \leq 0.35); \quad \text{Equation (7)}$$

$$Q_8=0.79 \times n_s+A8 (-1.64 \leq A8 \leq 0.01); \quad \text{Equation (8)}$$

$$Q_9=-0.64 \times n_s+A9 (1.26 \leq A9 \leq 1.55); \text{ and} \quad \text{Equation (9)}$$

$$Q_{10}=0.32 \times n_s+A10 (-0.38 \leq A10 \leq 0.19). \quad \text{Equation (10)}$$

In this case, $n_s$ shows a refractive index of lens substrate 10 in a wavelength of 587.56 nm (a d line). Each of the quarter wave optical thicknesses of the respective layers of antireflective film 20 in design reference wavelength $\lambda_0$ is obtained by dividing the optical thickness of each of the layers of antireflective film 20 by $\lambda_0/4$. The optical thickness of each of the layers of antireflective film 20 is obtained by a product of: the refractive index of each of the layers of antireflective film 20 in design reference wavelength $\lambda_0$; and the physical thickness (nm) of each of the layers of antireflective film 20.

Each of the layers of antireflective film 20 is formed by a vacuum deposition method, for example. Second layer 22 to ninth layer 29 each are preferably formed by an ion-assisted vacuum deposition method. Ion-assisted deposition reduces: a change in film density of antireflective film 20; and the surface roughness of the film, each of which is caused by variations in degree of vacuum and the like resulting from the vacuum deposition method. Such a change in film density changes the refractive index of the film. Such surface roughness of the film changes the film thickness. When the refractive index of the film and the film thickness are changed, color unevenness occurs in antireflective film 20 while the reproducibility of the reflection characteristics of antireflective film 20 decreases. Ion-assisted deposition suppresses occurrence of color unevenness in antireflective film 20 and also improves the reproducibility of the reflection characteristics of antireflective film 20. When antireflective film 20 is formed using ion-assisted deposition, layers forming antireflective film 20 can be made using a high refractive index material that has conventionally been relatively difficult to use.

The maximum reflectance of antireflective film 20 in a wavelength range of 430 nm or more and 670 nm or less is 0.2% or less. Specifically, the maximum reflectance of antireflective film 20 in a wavelength range of 430 nm or more and 670 nm or less is 0.1% or less.

EXAMPLES

Example 1

Referring to FIG. 1, Example 1 will be hereinafter described while comparing with comparative examples.

Figure 2:
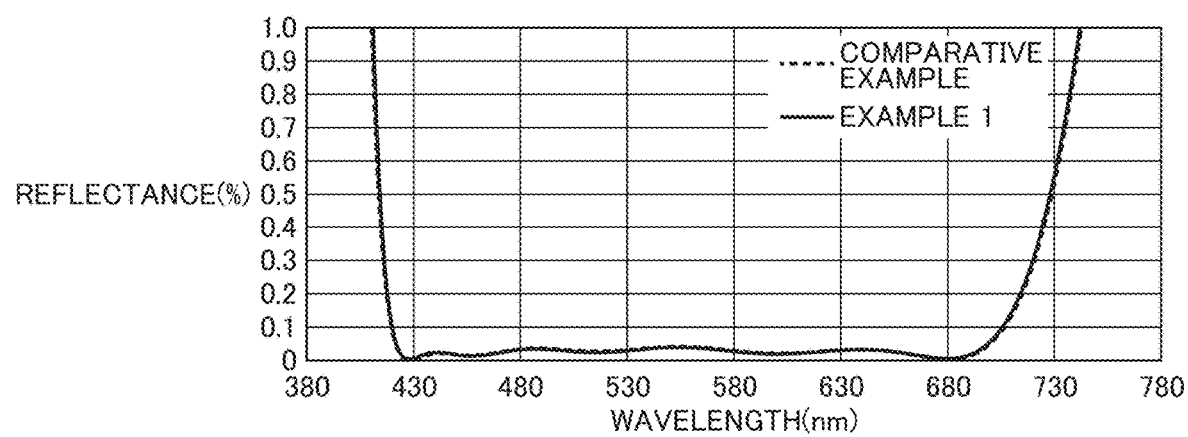
FIG. 2 is a diagram showing a simulation result of reflection spectra of antireflective films in Example 1 and a comparative example.

Table 1 shows the configuration of an optical lens with an antireflective film in a comparative example. Specifically, a glass material used for a lens substrate is BSC7 (manufactured by HOYA Corporation). An antireflective film is formed on the lens substrate. The antireflective film is formed of eight layers. In order from the air side, the first layer of the antireflective film is an $MgF_2$ layer. The first layer is an uppermost layer of the antireflective film. In order from the air side, each of the second, fourth, sixth, and eighth layers of the antireflective film is a $Ta_2O_5$ layer. The eighth layer is in contact with the lens substrate and located as a lowermost layer of the antireflective film. Each of the third, fifth, and seventh layers of the antireflective film is an $SiO_2$ layer. FIG. 2 shows a simulation result of the reflection spectrum of the antireflective film in a comparative example.

TABLE 1

Comparative Example (Design Reference Wavelength $\lambda_0$ = 550 nm)

| Layer | Material | Physical Thickness (nm) | QWOT | |
|---|---|---|---|---|
| Medium | Air (n = 1.00) | | | |
| First Layer | MgF$_2$ | 94.11 | Q$_1$ | 0.94 |
| Second Layer | Ta$_2$O$_5$ | 115.07 | Q$_2$ | 1.89 |
| Third Layer | SiO$_2$ | 187.32 | Q$_3$ | 2.01 |
| Fourth Layer | Ta$_2$O$_5$ | 40.87 | Q$_4$ | 0.67 |
| Fifth Layer | SiO$_2$ | 18.25 | Q$_5$ | 0.20 |
| Sixth Layer | Ta$_2$O$_5$ | 50.88 | Q$_6$ | 0.84 |
| Seventh Layer | SiO$_2$ | 40.69 | Q$_7$ | 0.44 |
| Eighth Layer | Ta$_2$O$_5$ | 13.04 | Q$_8$ | 0.21 |
| Lens Substrate | BSC7 (n$_8$ = 1.52 (Wavelength: 587.56 nm)) | | | |

Figure 3:
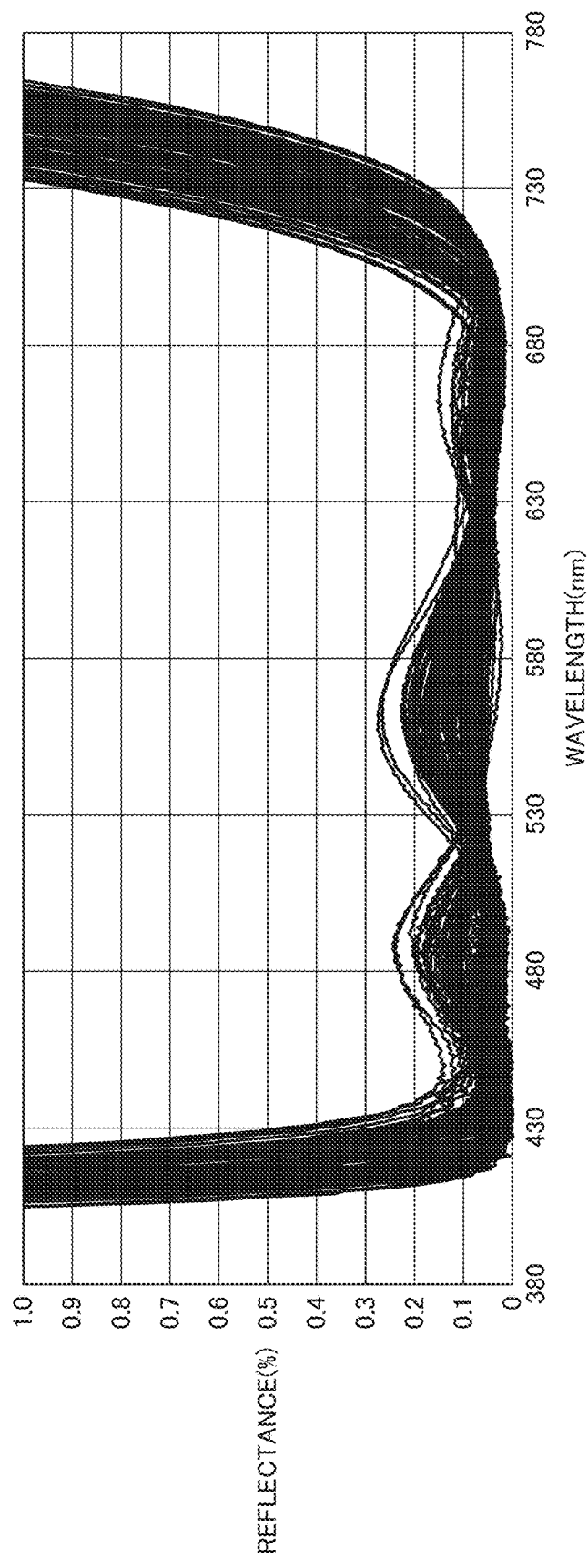
FIG. 3 is a diagram showing reflection spectra of antireflective films of 100 samples in a comparative example.

Then, 100 samples were manufactured each as an optical lens with an antireflective film in a comparative example. These 100 samples were manufactured in different production lots. Specifically, the second to eighth layers were formed on a lens substrate by an ion-assisted deposition method. Then, the first layer was formed on the second layer by a vacuum deposition method without ion assistance. FIG. 3 shows reflection spectra of the antireflective films of 100 samples in a comparative example. As shown in FIG. 3, the comparative example results in large variations in reflection spectrum of the antireflective film among production lots. In the comparative example, in each of some of 100 samples manufactured in different production lots, the maximum reflectance of the antireflective film in a wavelength range of 430 nm or more and 670 nm or less exceeds 0.2%.

Figure 4:
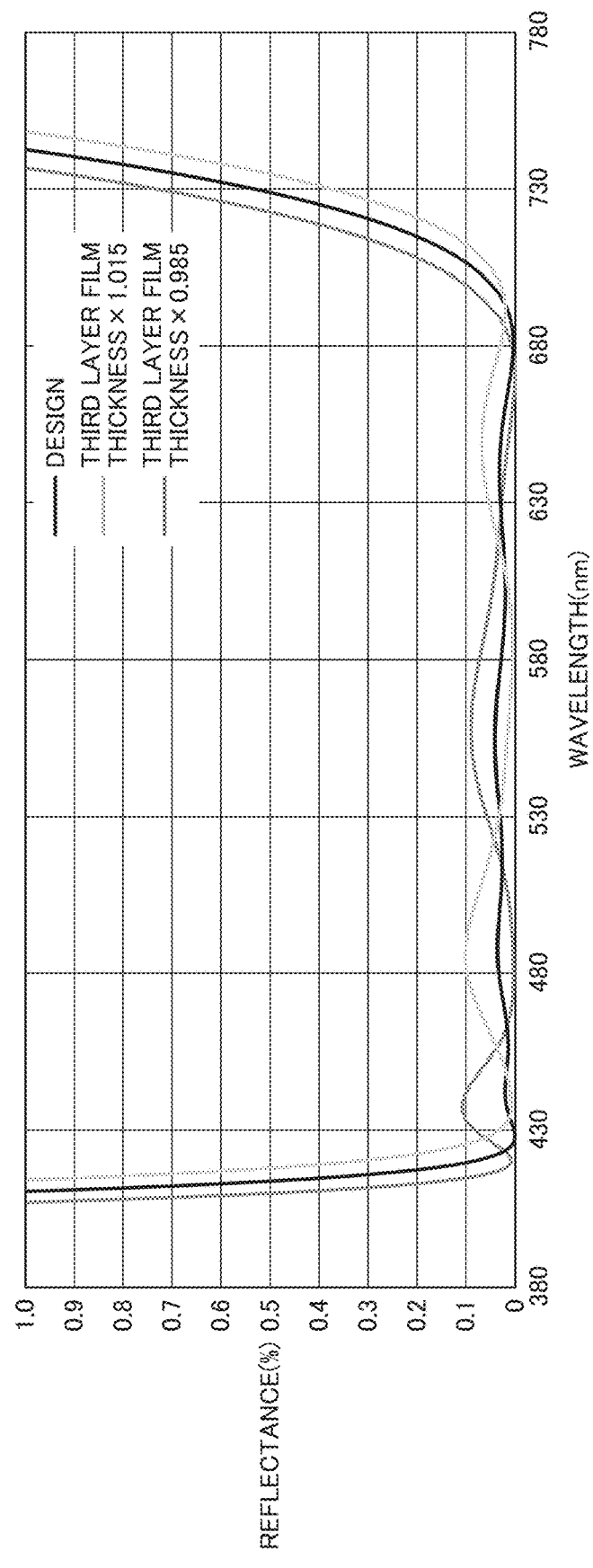
FIG. 4 is a diagram showing a simulation result of the reflection spectra of an antireflective film in a comparative example that are obtained when the third layer is changed in thickness.

FIG. 4 shows a simulation result of the reflection spectra of the antireflective film in a comparative example that are obtained when the third layer having the largest physical thickness in the antireflective film in the comparative example is changed in physical thickness by 1.5% from a design thickness (187.32 nm). The reflection spectrum of the antireflective film that is obtained when the physical thickness of the third layer is increased by 1.5% from the design thickness has: a maximum value of the reflection spectrum in a wavelength near 485 nm and a wavelength near 650 nm; and a minimum value of the reflection spectrum in a wavelength near 589 nm. The reflection spectrum of the antireflective film that is obtained when the physical thickness of the third layer is decreased by 1.5% from the design thickness has: a maximum value of the reflection spectrum in a wavelength near 560 nm; and a minimum value of the reflection spectrum in a wavelength near 480 nm and a wavelength near 680 nm. In this way, even when the physical thickness of the third layer is increased or decreased from the design thickness, the shape of the reflection spectrum of the antireflective film in the comparative example significantly changes.

Figure 5:
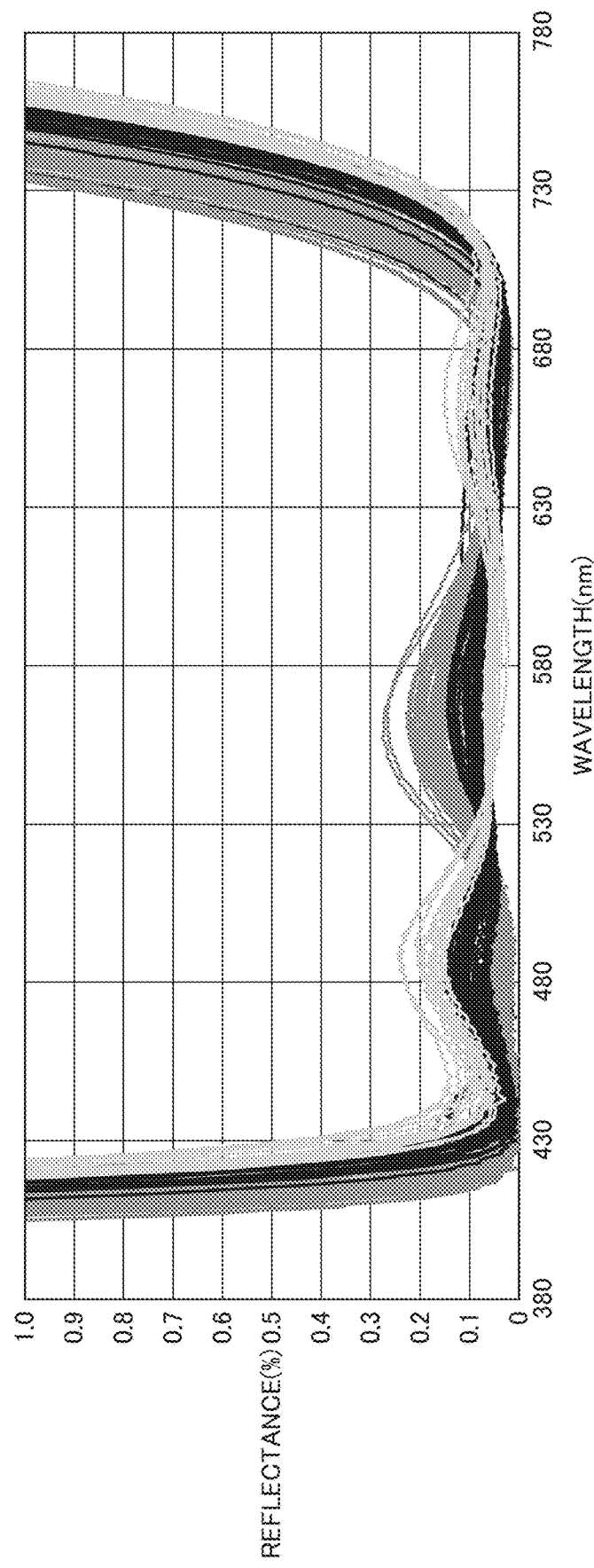
FIG. 5 is a diagram showing reflection spectra of antireflective films of 100 samples in a comparative example that are produced in different production lots.

In view of the simulation result as described above, the reflection spectra of the antireflective films of 100 samples in the comparative example were analyzed. FIG. 5 shows that the reflection spectra of the antireflective films of 100 samples in the comparative example include: a reflection spectrum of the antireflective film including the third layer having a physical thickness equal to the design thickness; a reflection spectrum of the antireflective film including the third layer having a physical thickness greater than the design thickness; and a reflection spectrum of the antireflective film including the third layer having a physical thickness smaller than the design thickness. Thus, the present inventors have found that larger variations in reflection spectrum of the antireflective film among production lots in the comparative example (see FIG. 3) are caused by the variations in physical thickness of the third layer having the largest physical thickness in the antireflective film among production lots.

Thus, the present inventors have designed an antireflective film of the present example by forming a layer corresponding to the third layer in the comparative example so as to include three layers that are less in physical thickness than the third layer in the comparative example.

Table 2 shows the configuration of optical lens 1 with an antireflective film in the present example shown in FIG. 1. Specifically, a glass material used for lens substrate 10 is BSC7 (manufactured by HOYA Corporation). Antireflective film 20 is formed on lens substrate 10. Antireflective film 20 is formed of ten layers. In order from the air side, first layer 21 of antireflective film 20 is an MgF$_2$ layer. First layer 21 is an uppermost layer of antireflective film 20. In order from the air side, each of second layer 22, fourth layer 24, sixth layer 26, eighth layer 28, and tenth layer 30 of antireflective film 20 is a Ta$_2$O$_5$ layer. Tenth layer 30 is in contact with lens substrate 10 and located as a lowermost layer of antireflective film 20. Each of third layer 23, fifth layer 25, seventh layer 27, and ninth layer 29 of antireflective film 20 is an SiO$_2$ layer.

TABLE 2

Example 1 (Design Reference Wavelength $\lambda_0$ = 550 nm)

| Layer | Material | Physical Thickness (nm) | QWOT | |
|---|---|---|---|---|
| Medium | Air (n = 1.00) | | | |
| First Layer | MgF$_2$ | 94.76 | Q$_1$ | 0.95 |
| Second Layer | Ta$_2$O$_5$ | 118.89 | Q$_2$ | 1.96 |
| Third Layer | SiO$_2$ | 74.56 | Q$_3$ | 0.80 |
| Fourth Layer | Ta$_2$O$_5$ | 10.00 | Q$_4$ | 0.16 |
| Fifth Layer | SiO$_2$ | 72.42 | Q$_5$ | 0.78 |
| Sixth Layer | Ta$_2$O$_5$ | 48.74 | Q$_6$ | 0.80 |
| Seventh Layer | SiO$_2$ | 12.00 | Q$_7$ | 0.13 |
| Eighth Layer | Ta$_2$O$_5$ | 57.26 | Q$_8$ | 0.94 |
| Ninth Layer | SiO$_2$ | 38.82 | Q$_9$ | 0.42 |
| Tenth Layer | Ta$_2$O$_5$ | 13.30 | Q$_{10}$ | 0.22 |
| Lens Substrate | BSC7 (n$_8$ = 1.52 (Wavelength: 587.56 nm)) | | | |

Third layer 23, fourth layer 24, and fifth layer 25 in the present example correspond to the third layer in the comparative example. Also, sixth layer 26 to tenth layer 30 in the present example correspond to the fourth layer to the eighth layer in the comparative example.

Third layer 23 in the present example is less in physical thickness than the third layer in the comparative example. The physical thickness of third layer 23 in the present example is 140 nm or less. The physical thickness of third layer 23 in the present example may be 120 nm or less, may be 100 nm or less, or may be 80 nm or less. Fourth layer 24 in the present example is less in physical thickness than the third layer in the comparative example. The physical thickness of fourth layer 24 in the present example is 140 nm or less. The physical thickness of fourth layer 24 in the present example may be 120 nm or less, may be 100 nm or less, may be 80 nm or less, may be 50 nm or less, or may be 30 nm or less. Fifth layer 25 in the present example is less in physical thickness than the third layer in the comparative example. The physical thickness of fifth layer 25 in the present example is 140 nm or less. The physical thickness of fifth layer 25 in the present example may be 120 nm or less, may be 100 nm or less, or may be 80 nm or less.

In the present example, the physical thickness of each of the layers forming antireflective film 20 is 140 nm or less.

Quarter wave optical thicknesses (QWOT) $Q_1$ to $Q_{10}$ of first layer 21 to tenth layer 30 in a design reference wavelength $\lambda_0$ of 550 nm satisfy the above-mentioned respective equations (1) to (10).

FIG. 2 shows a simulation result of the reflection spectrum of antireflective film 20 in the present example. In the simulation, the reflection spectrum of antireflective film 20 in the present example is the same as the reflection spectrum of the antireflective film in the comparative example.

First, 100 optical lenses 1 each with an antireflective film in the present example were manufactured. In this case, 100 samples were produced in different production lots. Specifically, second layer 22 to tenth layer 30 were formed on lens substrate 10 by an ion-assisted deposition method. On second layer 22, first layer 21 was formed by a vacuum deposition method without ion assistance. When first layer 21 is formed by an ion-assisted deposition method, ions collide with first layer 21 formed of a fluoride layer, and thus, fluorine desorbs from first layer 21, with the result that the optical absorptance of first layer 21 is increased. In contrast, in the present example, first layer 21 is formed by a vacuum deposition method without ion assistance. Thus, the optical absorptance of first layer 21 can be maintained low.

In order to suppress an increase in optical absorptance of first layer 21, the acceleration voltage and the ion current at an ion source of an ion-assisted deposition device that occur during formation of first layer 21 may be smaller than the acceleration voltage and the ion current at the ion source of the ion-assisted deposition device that occur during formation of second layer 22 to tenth layer 30.

Figure 6:
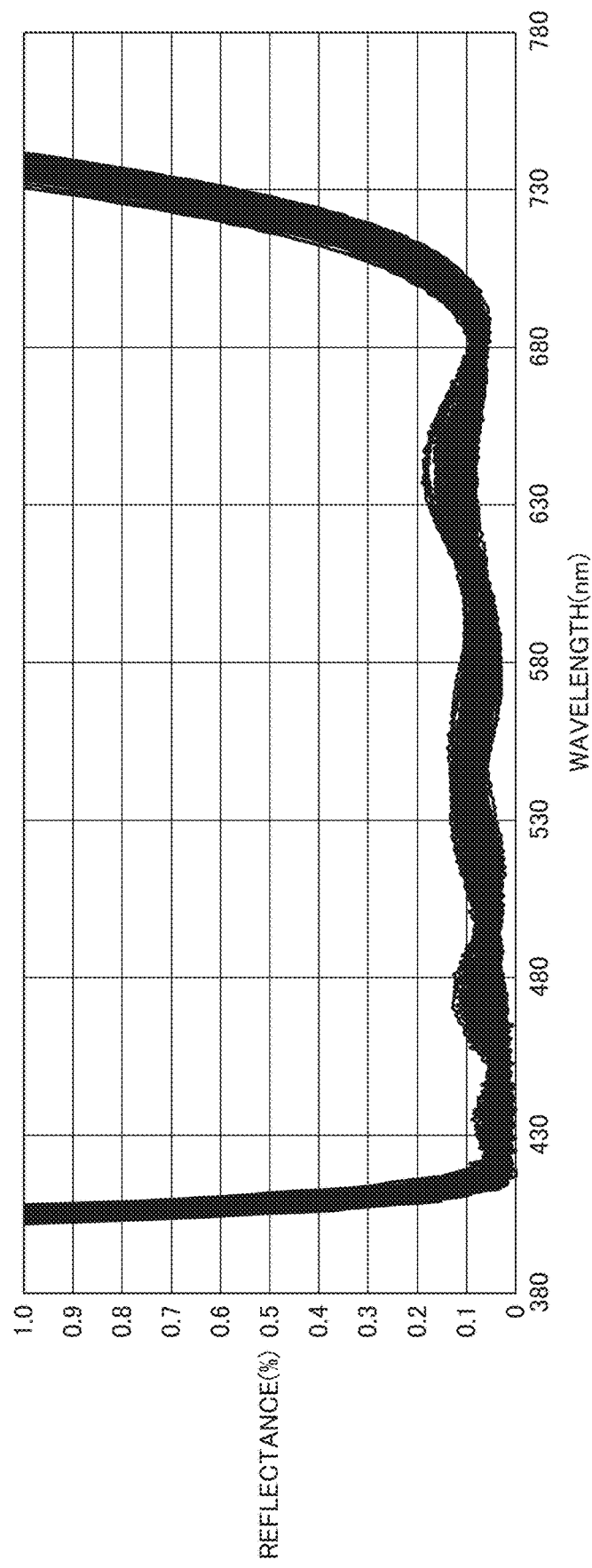
FIG. 6 is a diagram showing reflection spectra of antireflective films of 100 samples in Example 1 that are produced in different production lots.

FIG. 6 shows reflection spectra of antireflective films 20 of 100 samples in the present example. As shown in FIGS. 3 and 6, the variations in reflection spectrum of antireflective film 20 among production lots in the present example are smaller than the variations in reflection spectrum of the antireflective film among production lots in the comparative example. The reason therefor is as described below. Specifically, in the present example, the layer corresponding to the third layer in the comparative example is formed of third layer 23, fourth layer 24, and fifth layer 25, each of which is less in physical thickness than the third layer in the comparative example. The physical thickness of each of the layers forming antireflective film 20 is 140 nm or less. Also, quarter wave optical thicknesses $Q_1$ to $Q_{10}$ of first layer 21 to tenth layer 30 in a design reference wavelength of 550 nm satisfy the above-mentioned respective equations (1) to (10). Thus, the reflection spectrum of antireflective film 20 is less influenced by a change in physical thickness of each of third layer 23 to fifth layer 25. This reduces the variations in reflection spectrum of antireflective film 20 among production lots in the present example.

In the present example, in all of 100 samples manufactured in different production lots, the maximum reflectance of antireflective film 20 in a wavelength range of 430 nm or more and 670 nm or less is 0.2% or less. The first reason therefor is that, in the present example, quarter wave optical thicknesses (QWOT) $Q_1$ to $Q_{10}$ of first layer 21 to tenth layer 30 in a design reference wavelength $\lambda_0$ of 550 nm satisfy the above-mentioned respective equations (1) to (10). The second reason therefor is that the variations in reflection spectrum of antireflective film 20 among production lots in the present example are smaller than the variations in reflection spectrum of the antireflective film among production lots in the comparative example.

Example 2

Figure 7:
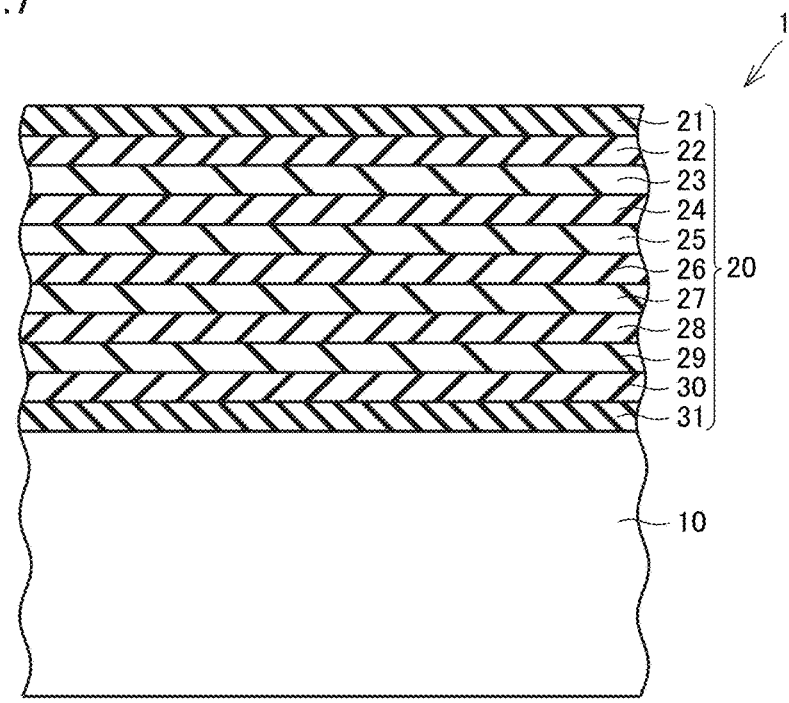
FIG. 7 is an enlarged partial cross-sectional view of an optical lens with an antireflective film in each of Examples 2 and 3.

Referring to FIG. 7, an optical lens 1 with an antireflective film in Example 2 will be hereinafter described. Table 3 shows the configuration of optical lens 1 with an antireflective film in the present example. Specifically, a glass material used for lens substrate 10 is FCD100 (manufactured by HOYA Corporation). Antireflective film 20 is formed on lens substrate 10. Antireflective film 20 is formed of eleven layers. In order from the air side, first layer 21 of antireflective film 20 is an $MgF_2$ layer. First layer 21 is an uppermost layer of antireflective film 20. In order from the air side, each of second layer 22, fourth layer 24, sixth layer 26, eighth layer 28, and tenth layer 30 of antireflective film 20 is a $Ta_2O_5$ layer. Each of third layer 23, fifth layer 25, seventh layer 27, and ninth layer 29 of antireflective film 20 is an $SiO_2$ layer. Eleventh layer 31 of antireflective film 20 is an $MgF_2$ layer. Eleventh layer 31 is in contact with lens substrate 10 and located as a lowermost layer of antireflective film 20.

TABLE 3

Example 2 (Design Reference Wavelength $\lambda_0$ = 550 nm)

| Layer | Material | Physical Thickness (nm) | QWOT | |
|---|---|---|---|---|
| Medium | Air (n = 1.00) | | | |
| First Layer | $MgF_2$ | 92.73 | $Q_1$ | 0.93 |
| Second Layer | $Ta_2O_5$ | 117.08 | $Q_2$ | 1.93 |
| Third Layer | $SiO_2$ | 69.66 | $Q_3$ | 0.75 |
| Fourth Layer | $Ta_2O_5$ | 12.00 | $Q_4$ | 0.20 |
| Fifth Layer | $SiO_2$ | 66.17 | $Q_5$ | 0.71 |
| Sixth Layer | $Ta_2O_5$ | 50.93 | $Q_6$ | 0.84 |
| Seventh Layer | $SiO_2$ | 12.00 | $Q_7$ | 0.13 |
| Eighth Layer | $Ta_2O_5$ | 51.18 | $Q_8$ | 0.84 |
| Ninth Layer | $SiO_2$ | 43.35 | $Q_9$ | 0.46 |
| Tenth Layer | $Ta_2O_5$ | 14.31 | $Q_{10}$ | 0.22 |
| Eleventh Layer | $MgF_2$ | 10.00 | $Q_{11}$ | 0.10 |
| Lens Substrate | FCD100 ($n_S$ = 1.44 (Wavelength: 587.56 nm)) | | | |

Third layer 23 in the present example is less in physical thickness than the third layer in the comparative example. The physical thickness of third layer 23 in the present example is 140 nm or less. The physical thickness of third layer 23 in the present example may be 120 nm or less, may be 100 nm or less, or may be 80 nm or less. Fourth layer 24 in the present example is less in physical thickness than the third layer in the comparative example. The physical thickness of fourth layer 24 in the present example is 140 nm or less. The physical thickness of fourth layer 24 in the present example may be 120 nm or less, may be 100 nm or less, may be 80 nm or less, may be 50 nm or less, or may be 30 nm or less. Fifth layer 25 in the present example is less in physical thickness than the third layer in the comparative example. The physical thickness of fifth layer 25 in the present example is 140 nm or less. The physical thickness of fifth layer 25 in the present example may be 120 nm or less, may be 100 nm or less, or may be 80 nm or less.

In the present example, the physical thickness of each of the layers forming antireflective film 20 is 140 nm or less. Quarter wave optical thicknesses (QWOT) $Q_1$ to $Q_{10}$ of first layer 21 to tenth layer 30 in a design reference wavelength $\lambda_0$ of 550 nm satisfy the above-mentioned respective equations (1) to (10).

Figure 8:
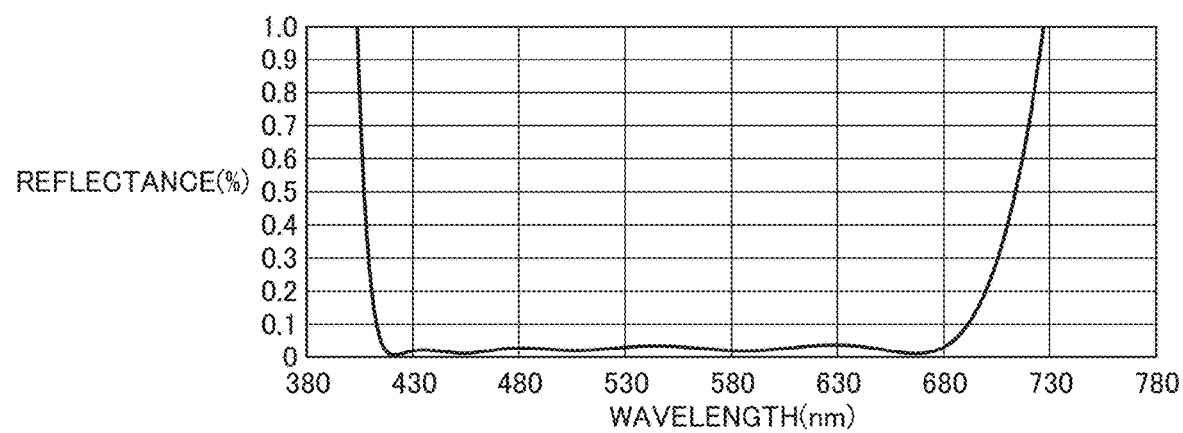
FIG. 8 is a diagram showing a simulation result of a reflection spectrum of the antireflective film in Example 2.

FIG. 8 shows a simulation result of a reflection spectrum of antireflective film 20 in the present example. As in Example 1, the maximum reflectance of antireflective film 20 in the present example in a wavelength range of 430 nm or more and 670 nm or less is 0.2% or less. The reason therefor is that, in the present example, the physical thickness of each of the layers forming antireflective film 20 is 140 nm or less, and also, quarter wave optical thicknesses (QWOT) $Q_1$ to $Q_{10}$ of first layer 21 to tenth layer 30 in a design reference wavelength $\lambda_0$ of 550 nm satisfy the above-mentioned respective equations (1) to (10).

Table 4 shows a composition of FCD100 (manufactured by HOYA Corporation) as a material of lens substrate 10. FCD100 contains fluoride of 40 mass % or more. In the present example, eleventh layer 31 in contact with lens substrate 10 containing a high proportion of fluoride is formed of a fluoride layer like an $MgF_2$ layer. Thus, antireflective film 20 is less likely to be peeled off from lens substrate 10.

TABLE 4

| FCD100 (Manufactured by HOYA Corporation) | |
|---|---|
| Chemical Component | Mass % |
| $P_2O_5$ | 1-10 |
| BaO | 1-10 |
| $AlF_3$ | 30-40 |
| $MgF_2$ | 1-10 |
| $CaF_2$ | 20-30 |
| $SrF_2$ | 20-30 |
| $BaF_2$ | 1-10 |
| $YF_3$ | 1-10 |
| $BaCl_2$ | 0-1 |

In the present example, tenth layer 30 and eleventh layer 31 are formed on lens substrate 10 by a vacuum deposition method without ion assistance. When eleventh layer 31 is formed by an ion-assisted deposition method, ions collide with eleventh layer 31 formed of a fluoride layer. When ions collide with eleventh layer 31, fluorine desorbs from eleventh layer 31, with the result that the optical absorptance of eleventh layer 31 is increased. In contrast, in the present example, eleventh layer 31 is formed by a vacuum deposition method without ion assistance. Thus, the optical absorptance of eleventh layer 31 can be maintained low.

When tenth layer 30 in contact with eleventh layer 31 is formed by an ion-assisted deposition method, ions may collide with eleventh layer 31 formed of a fluoride layer. When ions collide with eleventh layer 31, fluorine desorbs from eleventh layer 31, with the result that the optical absorptance of eleventh layer 31 is increased. In contrast, in the present example, tenth layer 30 is formed by a vacuum deposition method without ion assistance. Thus, the optical absorptance of eleventh layer 31 can be maintained low.

In order to suppress an increase in optical absorptance of eleventh layer 31, the acceleration voltage and the ion current at an ion source of an ion-assisted deposition device that occur during formation of tenth layer 30 and eleventh layer 31 may be smaller than the acceleration voltage and the ion current at the ion source of the ion-assisted deposition device that occur during formation of second layer 22 to ninth layer 29.

By the same method as that for forming second layer 22 to ninth layer 29 in Example 1, second layer 22 to ninth layer 29 are formed on tenth layer 30 by an ion-assisted deposition method. By the same method as that in Example 1, first layer 21 that is an $MgF_2$ layer is formed on second layer 22 by a vacuum deposition method without ion assistance. This prevents an increase in optical absorptance of first layer 21.

In the present example, the layer corresponding to the third layer in the comparative example is formed of third layer 23, fourth layer 24, and fifth layer 25, each of which is less in physical thickness than the third layer in the comparative example. The physical thickness of each of the layers forming antireflective film 20 is 140 nm or less. Also, quarter wave optical thicknesses $Q_1$ to $Q_{10}$ of first layer 21 to tenth layer 30 in a design reference wavelength of 550 nm satisfy the above-mentioned respective equations (1) to (10). Thus, the reflection spectrum of antireflective film 20 is less influenced by a change in physical thickness of each of third layer 23 to fifth layer 25. The variations in reflection spectrum of antireflective film 20 among production lots in the present example are smaller than the variations in reflection spectrum of the antireflective film among production lots in the comparative example.

Example 3

Referring to FIG. 7, optical lens 1 with an antireflective film in Example 3 will be hereinafter described. Table 5 shows the configuration of optical lens 1 with an antireflective film in the present example. Specifically, a glass material used for lens substrate 10 is BSC7 (manufactured by HOYA Corporation). Antireflective film 20 is formed on lens substrate 10. Antireflective film 20 is formed of eleven layers. In order from the air side, first layer 21 of antireflective film 20 is an $MgF_2$ layer. First layer 21 is an uppermost layer of antireflective film 20. In order from the air side, each of second layer 22, fourth layer 24, sixth layer 26, eighth layer 28, and tenth layer 30 of antireflective film 20 is a $Ta_2O_5$ layer. Each of third layer 23, fifth layer 25, seventh layer 27, and ninth layer 29 of antireflective film 20 is an $SiO_2$ layer. Eleventh layer 31 of antireflective film 20 is an $MgF_2$ layer. Eleventh layer 31 is in contact with lens substrate 10 and located as a lowermost layer of antireflective film 20.

TABLE 5

| Example 3 (Design Reference Wavelength 20 = 550 nm) | | | | |
|---|---|---|---|---|
| Layer | Material | Physical Thickness (nm) | QWOT | |
| Medium | Air (Refractive Index n = 1.00) | | | |
| First Layer | $MgF_2$ | 92.78 | $Q_1$ | 0.93 |
| Second Layer | $Ta_2O_5$ | 117.26 | $Q_2$ | 1.93 |
| Third Layer | $SiO_2$ | 68.91 | $Q_3$ | 0.74 |
| Fourth Layer | $Ta_2O_5$ | 12.00 | $Q_4$ | 0.20 |
| Fifth Layer | $SiO_2$ | 67.40 | $Q_5$ | 0.72 |
| Sixth Layer | $Ta_2O_5$ | 48.20 | $Q_6$ | 0.79 |
| Seventh Layer | $SiO_2$ | 12.00 | $Q_7$ | 0.13 |
| Eighth Layer | $Ta_2O_5$ | 55.08 | $Q_8$ | 0.91 |
| Ninth Layer | $SiO_2$ | 36.71 | $Q_9$ | 0.39 |
| Tenth Layer | $Ta_2O_5$ | 17.87 | $Q_{10}$ | 0.28 |
| Eleventh Layer | $MgF_2$ | 10.00 | $Q_{11}$ | 0.10 |
| Lens Substrate | BSC7 ($n_g$ = 1.52 (Wavelength: 587.56 nm)) | | | |

Third layer 23 in the present example is less in physical thickness than the third layer in the comparative example. The physical thickness of third layer 23 in the present example is 140 nm or less. The physical thickness of third layer 23 in the present example may be 120 nm or less, may be 100 nm or less, or may be 80 nm or less. Fourth layer 24 in the present example is less in physical thickness than the third layer in the comparative example. The physical thickness of fourth layer 24 in the present example is 140 nm or less. The physical thickness of fourth layer 24 in the present example may be 120 nm or less, may be 100 nm or less, may be 80 nm or less, may be 50 nm or less, or may be 30 nm or less. Fifth layer 25 in the present example is less in physical thickness than the third layer in the comparative example. The physical thickness of fifth layer 25 in the present example is 140 nm or less. The physical thickness of fifth layer 25 in the present example may be 120 nm or less, may be 100 nm or less, or may be 80 nm or less.

In the present example, the physical thickness of each of the layers forming antireflective film 20 is 140 nm or less. Quarter wave optical thicknesses (QWOT) $Q_1$ to $Q_{10}$ of first layer 21 to tenth layer 30 in a design reference wavelength $\lambda_0$ of 550 nm satisfy the above-mentioned respective equations (1) to (10).

Figure 9:
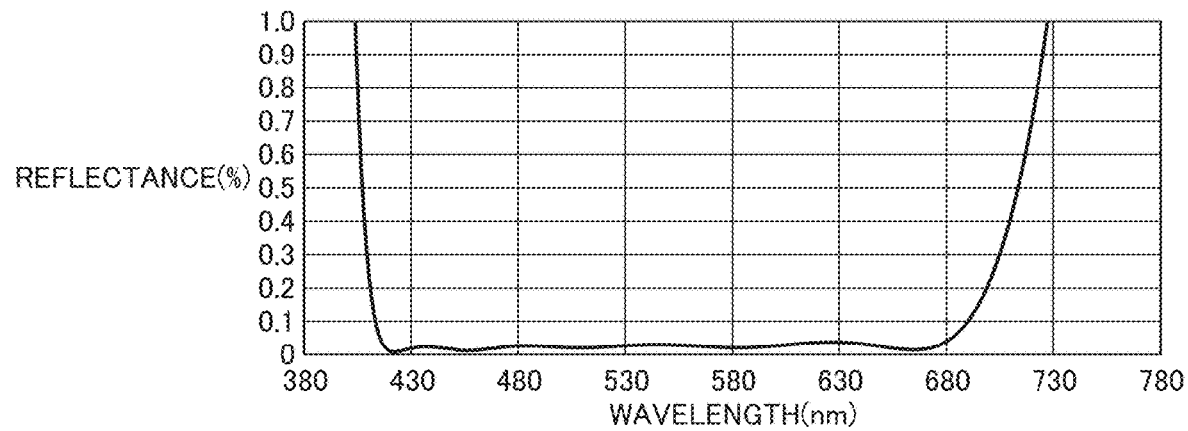
FIG. 9 is a diagram showing a simulation result of a reflection spectrum of the antireflective film in Example 3.

FIG. 9 shows a simulation result of a reflection spectrum of antireflective film 20 in the present example. As in Example 1, the maximum reflectance of antireflective film 20 in the present example in a wavelength range of 430 nm or more and 670 nm or less is 0.2% or less. The reason therefor is that, in the present example, the physical thickness of each of the layers forming antireflective film 20 is 140 nm or less, and also, quarter wave optical thicknesses (QWOT) $Q_1$ to $Q_{10}$ of first layer 21 to tenth layer 30 in a design reference wavelength $\lambda_0$ of 550 nm satisfy the above-mentioned respective equations (1) to (10).

In the present example, by the same method as that for forming tenth layer 30 and eleventh layer 31 in Example 2, tenth layer 30 and eleventh layer 31 are formed on lens substrate 10 by a vacuum deposition method without ion assistance. This prevents an increases in optical absorptance of eleventh layer 31. By the same method as that for forming second layer 22 to ninth layer 29 in Example 2, second layer 22 to ninth layer 29 are formed on tenth layer 30 by an ion-assisted deposition method. By the same method as that in Example 1, first layer 21 that is an $MgF_2$ layer is formed on second layer 22 by a vacuum deposition method without ion assistance. This prevents an increase in optical absorptance of first layer 21.

In the present example, the layer corresponding to the third layer in the comparative example is formed of third layer 23, fourth layer 24, and fifth layer 25, each of which is less in physical thickness than the third layer in the comparative example. The physical thickness of each of the layers forming antireflective film 20 is 140 nm or less. Also, quarter wave optical thicknesses $Q_1$ to $Q_{10}$ of first layer 21 to tenth layer 30 in a design reference wavelength of 550 nm satisfy the above-mentioned respective equations (1) to (10). Thus, the reflection spectrum of antireflective film 20 is less influenced by a change in physical thickness of each of third layer 23 to fifth layer 25. The variations in reflection spectrum of antireflective film 20 among production lots in the present example are smaller than the variations in reflection spectrum of the antireflective film among production lots in the comparative example.

Example 4

Figure 10:
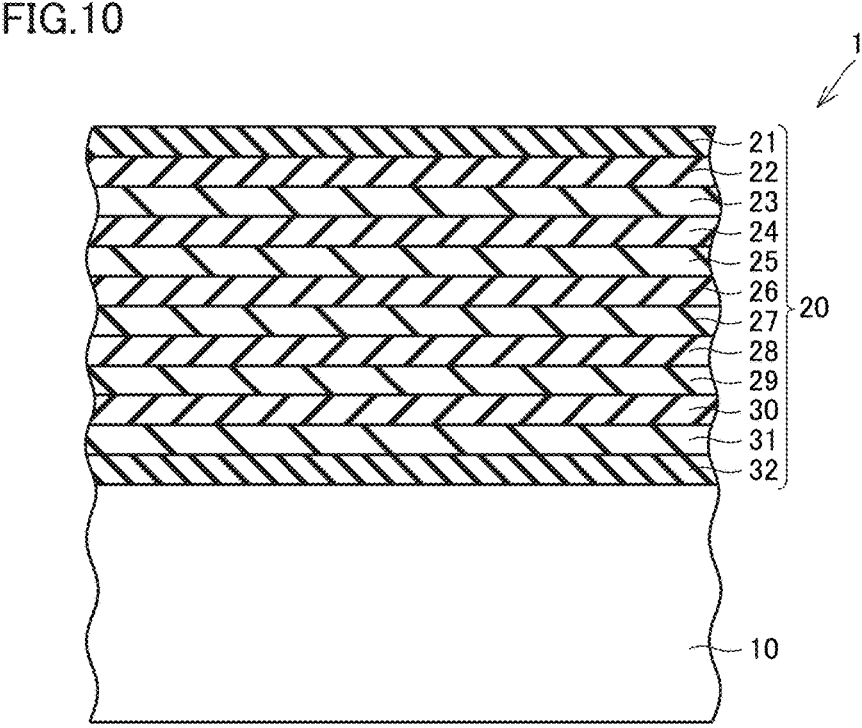
FIG. 10 is an enlarged partial cross-sectional view of an optical lens with an antireflective film in Example 4.

Referring to FIG. 10, optical lens 1 with an antireflective film in Example 4 will be hereinafter described. Table 6 shows the configuration of optical lens 1 with an antireflective film in the present example. Specifically, a glass material used for lens substrate 10 is BSC7 (manufactured by HOYA Corporation). Antireflective film 20 is formed on lens substrate 10. Antireflective film 20 is formed of twelve layers. In order from the air side, first layer 21 of antireflective film 20 is an $MgF_2$ layer. First layer 21 is an uppermost layer of antireflective film 20. In order from the air side, each of second layer 22, fourth layer 24, sixth layer 26, eighth layer 28, and tenth layer 30 of antireflective film 20 is a $Ta_2O_5$ layer. Each of third layer 23, fifth layer 25, seventh layer 27, ninth layer 29, and eleventh layer 31 of antireflective film 20 is an $SiO_2$ layer. Twelfth layer 32 of antireflective film 20 is an $MgF_2$ layer. Twelfth layer 32 is in contact with lens substrate 10 and located as a lowermost layer of antireflective film 20.

TABLE 6

Example 4 (Design Reference Wavelength 20 = 550 nm)

| Layer | Material | Physical Thickness (nm) | QWOT | |
|---|---|---|---|---|
| Medium | Air (Refractive Index n = 1.00) | | | |
| First Layer | $MgF_2$ | 92.01 | $Q_1$ | 0.92 |
| Second Layer | $Ta_2O_5$ | 115.99 | $Q_2$ | 1.91 |
| Third Layer | $SiO_2$ | 67.11 | $Q_3$ | 0.72 |
| Fourth Layer | $Ta_2O_5$ | 12.00 | $Q_4$ | 0.20 |
| Fifth Layer | $SiO_2$ | 64.88 | $Q_5$ | 0.70 |
| Sixth Layer | $Ta_2O_5$ | 44.81 | $Q_6$ | 0.74 |
| Seventh Layer | $SiO_2$ | 12.00 | $Q_7$ | 0.13 |
| Eighth Layer | $Ta_2O_5$ | 48.91 | $Q_8$ | 0.80 |
| Ninth Layer | $SiO_2$ | 31.63 | $Q_9$ | 0.34 |
| Tenth Layer | $Ta_2O_5$ | 12.00 | $Q_{10}$ | 0.20 |
| Eleventh Layer | $SiO_2$ | 132.41 | $Q_{11}$ | 1.42 |
| Twelfth Layer | $MgF_2$ | 15.00 | $Q_{12}$ | 0.15 |
| Lens Substrate | BSC7 ($n_g$ = 1.52 (Wavelength: 587.56 nm)) | | | |

Third layer 23 in the present example is less in physical thickness than the third layer in the comparative example. The physical thickness of third layer 23 in the present example is 140 nm or less. The physical thickness of third layer 23 in the present example may be 120 nm or less, may be 100 nm or less, or may be 80 nm or less. Fourth layer 24 in the present example is less in physical thickness than the third layer in the comparative example. The physical thickness of fourth layer 24 in the present example is 140 nm or less. The physical thickness of fourth layer 24 in the present example may be 120 nm or less, may be 100 nm or less, may be 80 nm or less, may be 50 nm or less, or may be 30 nm or less. Fifth layer 25 in the present example is less in physical thickness than the third layer in the comparative example. The physical thickness of fifth layer 25 in the present example is 140 nm or less. The physical thickness of fifth layer 25 in the present example may be 120 nm or less, may be 100 nm or less, or may be 80 nm or less.

In the present example, the physical thickness of each of the layers forming antireflective film 20 is 140 nm or less. Quarter wave optical thicknesses (QWOT) $Q_1$ to $Q_{10}$ of first layer 21 to tenth layer 30 in a design reference wavelength $\lambda_0$ of 550 nm satisfy the above-mentioned respective equations (1) to (10).

Figure 11:
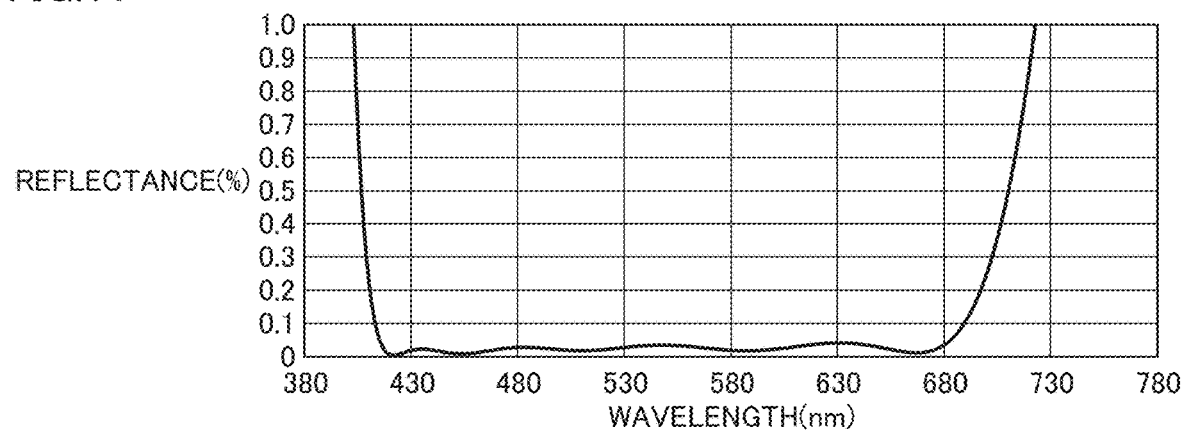
FIG. 11 is a diagram showing a simulation result of a reflection spectrum of the antireflective film in Example 4.

FIG. 11 shows a simulation result of a reflection spectrum of antireflective film 20 in the present example. As in Example 1, the maximum reflectance of antireflective film 20 in the present example in a wavelength range of 430 nm or more and 670 nm or less is 0.2% or less. The reason therefor is that, in the present example, the physical thickness of each of the layers forming antireflective film 20 is 140 nm or less, and also, quarter wave optical thicknesses (QWOT) $Q_1$ to $Q_{10}$ of first layer 21 to tenth layer 30 in a design reference wavelength $\lambda_0$ of 550 nm satisfy the above-mentioned respective equations (1) to (10).

In the present example, by the same method as that for forming tenth layer 30 and eleventh layer 31 in Example 2, a lower half of eleventh layer 31 and twelfth layer 32 are formed by a vacuum deposition method without ion assistance. This prevents an increase in optical absorptance of twelfth layer 32. By the same method as that for forming second layer 22 to ninth layer 29 in Example 2, an upper half of eleventh layer 31 and second layer 22 to tenth layer 30 are formed by an ion-assisted deposition method. The lower half of eleventh layer 31 corresponds to a portion of eleventh layer 31 that is located close to twelfth layer 32 with respect to the center of eleventh layer 31 in the thickness direction of eleventh layer 31. The upper half of eleventh layer 31 corresponds to a portion of eleventh layer 31 that is located close to tenth layer 30 with respect to the center of eleventh layer 31 in the thickness direction of eleventh layer 31. By the same method as that in Example 1, first layer 21 that is an $MgF_2$ layer is formed on second layer 22 by a vacuum deposition method without ion assistance. This prevents an increase in optical absorptance of first layer 21.

In the present example, the layer corresponding to the third layer in the comparative example is formed of third layer 23, fourth layer 24, and fifth layer 25, each of which is smaller in physical thickness than the third layer in the comparative example. The physical thickness of each of the layers forming antireflective film 20 is 140 nm or less. Also, quarter wave optical thicknesses $Q_1$ to $Q_{10}$ of first layer 21 to tenth layer 30 in a design reference wavelength of 550 nm satisfy the above-mentioned respective equations (1) to (10). Thus, the reflection spectrum of antireflective film 20 is less influenced by a change in physical thickness of each of third layer 23 to fifth layer 25. The variations in reflection spectrum of antireflective film 20 among production lots in the present example are smaller than the variations in reflection spectrum of the antireflective film among production lots in the comparative example.

Example 5

Referring to FIG. 1, optical lens 1 with an antireflective film in Example 5 will be hereinafter described. Table 7 shows the configuration of optical lens 1 with an antireflective film in the present example. Specifically, a glass material used for lens substrate 10 is E-FDS1-W (manufactured by HOYA Corporation). Antireflective film 20 is formed on lens substrate 10. Antireflective film 20 is formed of ten layers. In order from the air side, first layer 21 of antireflective film 20 is an $MgF_2$ layer. First layer 21 is an uppermost layer of antireflective film 20. In order from the air side, each of second layer 22, fourth layer 24, sixth layer 26, eighth layer 28, and tenth layer 30 of antireflective film 20 is a $Ta_2O_5$ layer. Tenth layer 30 is in contact with lens substrate 10 and located as a lowermost layer of antireflective film 20. Each of third layer 23, fifth layer 25, seventh layer 27, and ninth layer 29 of antireflective film 20 is an $SiO_2$ layer.

TABLE 7

| Example 5 (Design Reference Wavelength 20 = 550 nm) | | | | |
|---|---|---|---|---|
| Layer | Material | Physical Thickness (nm) | QWOT | |
| Medium | Air (Refractive Index n = 1.00) | | | |
| First Layer | $MgF_2$ | 92.32 | $Q_1$ | 0.93 |
| Second Layer | $Ta_2O_5$ | 117.09 | $Q_2$ | 1.93 |
| Third Layer | $SiO_2$ | 65.13 | $Q_3$ | 0.70 |
| Fourth Layer | $Ta_2O_5$ | 12.00 | $Q_4$ | 0.20 |
| Fifth Layer | $SiO_2$ | 70.28 | $Q_5$ | 0.75 |
| Sixth Layer | $Ta_2O_5$ | 35.97 | $Q_6$ | 0.59 |
| Seventh Layer | $SiO_2$ | 12.00 | $Q_7$ | 0.13 |
| Eighth Layer | $Ta_2O_5$ | 80.50 | $Q_8$ | 1.32 |
| Ninth Layer | $SiO_2$ | 14.90 | $Q_9$ | 0.16 |
| Tenth Layer | $Ta_2O_5$ | 20.96 | $Q_{10}$ | 0.34 |
| Lens Substrate | E-FDS1-W ($n_8$ = 1.92 (Wavelength: 587.56 nm)) | | | |

Third layer 23 in the present example is less in physical thickness than the third layer in the comparative example. The physical thickness of third layer 23 in the present example is 140 nm or less. The physical thickness of third layer 23 in the present example may be 120 nm or less, may be 100 nm or less, or may be 80 nm or less. Fourth layer 24 in the present example is less in physical thickness than the third layer in the comparative example. The physical thickness of fourth layer 24 in the present example is 140 nm or less. The physical thickness of fourth layer 24 in the present example may be 120 nm or less, may be 100 nm or less, may be 80 nm or less, may be 50 nm or less, or may be 30 nm or less. Fifth layer 25 in the present example is less in physical thickness than the third layer in the comparative example. The physical thickness of fifth layer 25 in the present example is 140 nm or less. The physical thickness of fifth layer 25 in the present example may be 120 nm or less, may be 100 nm or less, or may be 80 nm or less.

In the present example, the physical thickness of each of the layers forming antireflective film 20 is 140 nm or less, and also, quarter wave optical thicknesses (QWOT) $Q_1$ to $Q_{10}$ of first layer 21 to tenth layer 30 in a design reference wavelength $\lambda_0$ of 550 nm satisfy the above-mentioned respective equations (1) to (10).

Figure 12:
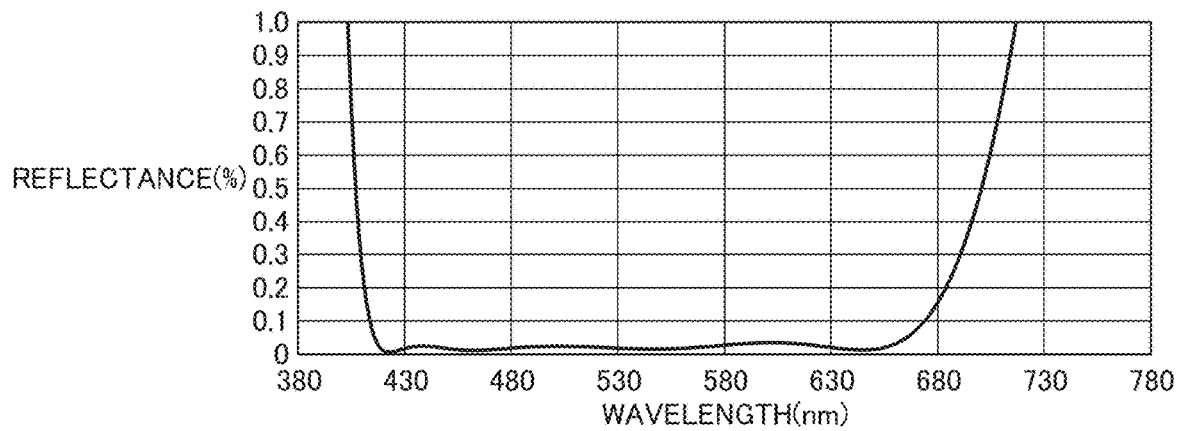
FIG. 12 is a diagram showing a simulation result of a reflection spectrum of an antireflective film in Example 5.

FIG. 12 shows a simulation result of a reflection spectrum of antireflective film 20 in the present example. As in Example 1, the maximum reflectance of antireflective film 20 in the present example in a wavelength range of 430 nm or more and 670 nm or less is 0.2% or less. The reason therefor is that, in the present example, the physical thickness of each of the layers forming antireflective film 20 is 140 nm or less, and also, quarter wave optical thicknesses (QWOT) $Q_1$ to $Q_{10}$ of first layer 21 to tenth layer 30 in a design reference wavelength $\lambda_0$ of 550 nm satisfy the above-mentioned respective equations (1) to (10).

In the present example, by the same method as that in Example 1, second layer 22 to tenth layer 30 are formed on lens substrate 10 by an ion-assisted deposition method. By the same method as that in Example 1, first layer 21 that is an $MgF_2$ layer is formed on second layer 22 by a vacuum deposition method without ion assistance. This prevents an increase in optical absorptance of first layer 21.

In the present example, the layer corresponding to the third layer in the comparative example is formed of third layer 23, fourth layer 24, and fifth layer 25, each of which is smaller in physical thickness than the third layer in the comparative example. The physical thickness of each of the layers forming antireflective film 20 is 140 nm or less. Also, quarter wave optical thicknesses $Q_1$ to $Q_{10}$ of first layer 21 to tenth layer 30 in a design reference wavelength of 550 nm satisfy the above-mentioned respective equations (1) to (10). Thus, the reflection spectrum of antireflective film 20 is less influenced by a change in physical thickness of each of third layer 23 to fifth layer 25. The variations in reflection spectrum of antireflective film 20 among production lots in the present example are smaller than the variations in reflection spectrum of the antireflective film among production lots in the comparative example.

<Projection Lens and Projection Lens Optical System LN>

Figure 13:
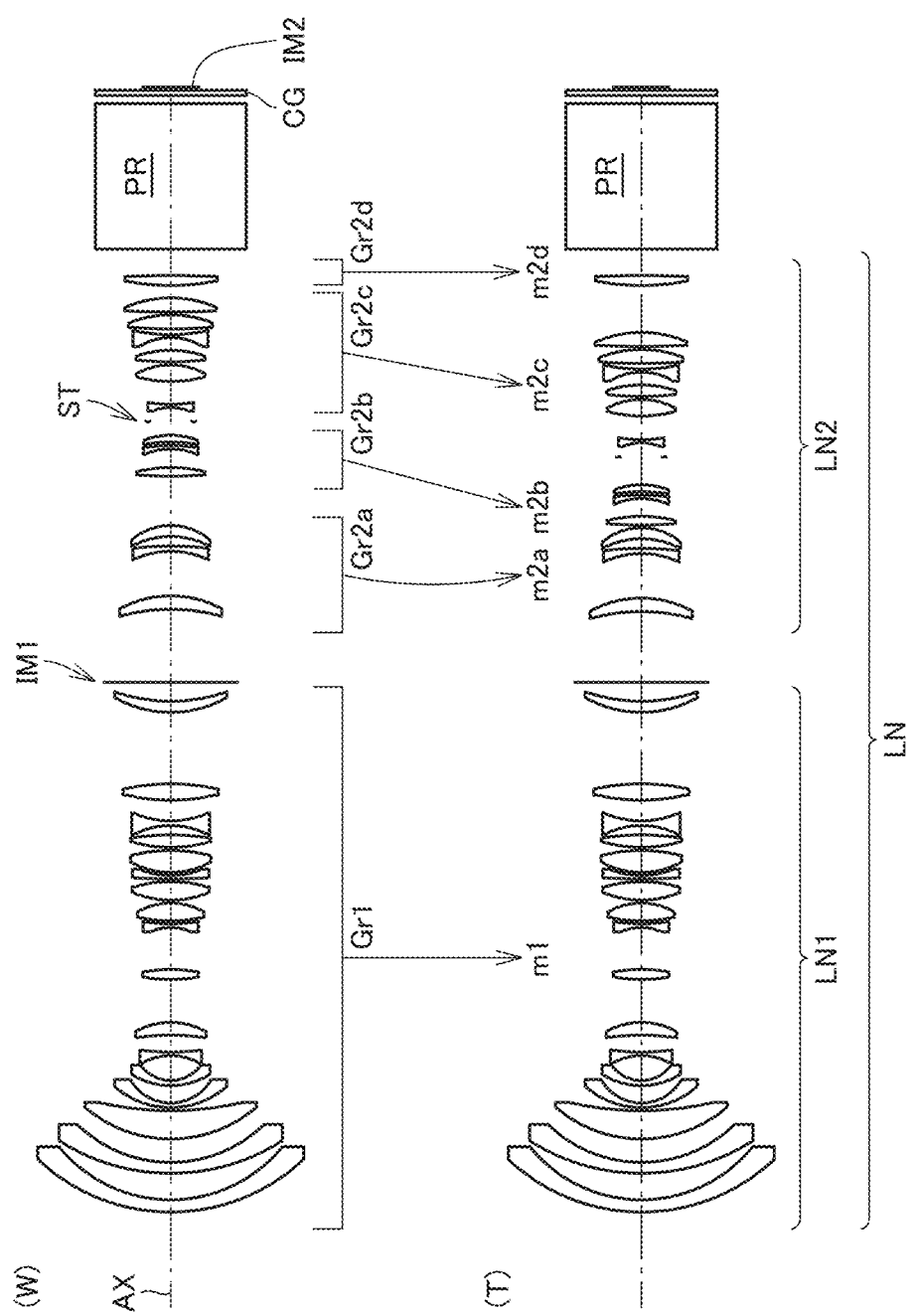
FIG. 13 is a diagram showing a configuration of a projection lens optical system in one or more embodiments.

Referring to FIG. 13, a projection lens and a projection lens optical system LN in one or more embodiments will then be described.

Projection lens optical system LN includes a plurality of projection lenses. Projection lens optical system LN is formed of thirty projection lenses, for example. In order to achieve a wide angle of view and excellent projection performance, projection lens optical system LN includes a relay lens. This increases the number of projection lenses that form projection lens optical system LN. Optical lens 1 with an antireflective film in one or more embodiments is applied to at least one of the plurality of projection lenses.

The right side in FIG. 13 is a reduction side of projection lens optical system LN while the left side in FIG. 13 is an enlargement side of projection lens optical system LN. On the reduction side of projection lens optical system LN, a prism PR (for example, a total internal reflection (TIR) prism, a color separation/synthesis prism, or the like) and a cover glass CG covering an image display surface IM2 of an image display element are disposed.

Projection lens optical system LN includes a first optical system LN1 and a second optical system LN2. First optical system LN1 is disposed on the enlargement side with respect to an intermediate image plane IM1. Second optical system LN2 is disposed on the reduction side with respect to intermediate image plane IM1. Second optical system LN2 forms, on intermediate image plane IM1, an intermediate image of an image displayed on image display surface IM2 of an image display element. First optical system LN1 enlarges and projects the intermediate image. Also, an aperture stop ST is located in the vicinity of the center of second optical system LN2 in the direction along an optical axis AX.

FIG. 13 shows a lens arrangement of a wide-angle end (W) and a lens arrangement of a telephoto end (T) in projection lens optical system LN. In FIG. 13, arrows m1, m2a, m2b, m2c, and m2d show changes in position of lenses in a first lens group Gr1, a second a-lens group Gr2a, a second b-lens group Gr2b, a second c-lens group Gr2c, and a second d-lens group Gr2d, respectively, when the lens arrangement is switched from the wide-angle end (W) to the telephoto end (T). For example, first lens group Gr1 and second d-lens group Gr2d are fixed groups while second a-lens group Gr2a, second b-lens group Gr2b, and second c-lens group Gr2c are moving groups. Second a-lens group Gr2a, second b-lens group Gr2b, and second c-lens group Gr2c are moved along optical axis AX for zooming.

Projection lens optical system LN may also include a plurality of optical lenses 1 each with an antireflective film in one or more embodiments. For example, the projection lens optical system may include: a first projection lens that is optical lens 1 with an antireflective film; a second projection lens that is optical lens 1 with an antireflective film; and a third projection lens that is optical lens 1 with an antireflective film. A first refractive index of lens substrate 10 of the first projection lens, a second refractive index of lens substrate 10 of the second projection lens, and a third refractive index of lens substrate 10 of the third projection lens satisfy a first equation, a second equation, and a third equation, respectively. The first, second, and third equations are three equations selected from equations (11), (12), (13), (14), (15), and (16) and different from each other:

$$1.35 \leq n_s < 1.45; \qquad \text{Equation (11)}$$

$$1.45 \leq n_s < 1.55; \qquad \text{Equation (12)}$$

$$1.55 \leq n_s < 1.65; \qquad \text{Equation (13)}$$

$$1.65 \leq n_s < 1.75; \qquad \text{Equation (14)}$$

$$1.75 \leq n_s < 1.85; \text{ and} \qquad \text{Equation (15)}$$

$$1.85 \leq n_s < 1.95. \qquad \text{Equation (16)}$$

In addition to the first projection lens to the third projection lens, projection lens optical system LN may further include a fourth projection lens as optical lens 1 with an antireflective film. The fourth refractive index of lens substrate 10 of the fourth projection lens satisfies the fourth equation. The first, second, third, and fourth equations are four equations selected from the above-mentioned equations (11) to (16) and different from each other.

In addition to the first projection lens to the fourth projection lens, projection lens optical system LN may further include a fifth projection lens as optical lens 1 with an antireflective film. The fifth refractive index of lens substrate 10 of the fifth projection lens satisfies the fifth equation. The first, second, third, fourth, and fifth equations are five equations selected from the above-mentioned equations (11) to (16) and different from each other.

In addition to the first projection lens to the fifth projection lens, projection lens optical system LN may further include a sixth projection lens as optical lens 1 with an antireflective film. The sixth refractive index of lens substrate 10 of the sixth projection lens satisfies the sixth equation. The first, second, third, fourth, fifth, and sixth equations are six equations selected from the above-mentioned equations (11) to (16) and different from each other.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An optical lens with an antireflective film, comprising:
a lens substrate; and
an antireflective film disposed on the lens substrate, wherein
the antireflective film is formed of layers each having a physical thickness of 140 nm or less,
in order from an air side, the antireflective film has:
a first layer formed as an $MgF_2$ layer,
a second layer, a fourth layer, a sixth layer, an eighth layer, and a tenth layer each having a refractive index of 2.0 or more and 2.3 or less, and
a third layer, a fifth layer, a seventh layer, and a ninth layer each formed as an $SiO_2$ layer, and
quarter wave optical thicknesses $Q_1$, $Q_2$, $Q_3$, $Q_4$, $Q_5$, $Q_6$, $Q_7$, $Q_8$, $Q_9$, and $Q_{10}$ of the first, second, third, fourth, fifth, sixth, seventh, eighth, ninth, and tenth layers, respectively, in a design reference wavelength $\lambda_0$ of 550 nm satisfy equations (1), (2), (3), (4), (5), (6), (7), (8), (9), and (10), respectively:

$$Q_1 = 0.05 \times n_s + A1 (0.79 \leq A1 \leq 0.91); \qquad \text{Equation (1)}$$

$$Q_2 = 0.09 \times n_s + A2 (1.64 \leq A2 \leq 1.85); \qquad \text{Equation (2)}$$

$$Q_3 = A3 (0.68 \leq A3 \leq 1.02); \qquad \text{Equation (3)}$$

$$Q_4 = A4 (0.02 \leq A4 \leq 0.22); \qquad \text{Equation (4)}$$

$$Q_5 = A5 (0.68 \leq A5 \leq 1.02); \qquad \text{Equation (5)}$$

$$Q_6 = -0.31 \times n_s + A6 (1.01 \leq A6 \leq 1.29); \qquad \text{Equation (6)}$$

$$Q_7 = A7 (0.10 \leq A7 \leq 0.35); \qquad \text{Equation (7)}$$

$$Q_8 = 0.79 \times n_s + A8 (-1.64 \leq A8 \leq 0.01); \qquad \text{Equation (8)}$$

$$Q_9 = -0.64 \times n_s + A9 (1.26 \leq A9 \leq 1.55); \text{ and} \qquad \text{Equation (9)}$$

$$Q_{10} = 0.32 \times n_s + A10 (-0.38 \leq A10 \leq 0.19), \qquad \text{Equation (10)}$$

where $n_s$ shows a refractive index of the lens substrate in a wavelength of 587.56 nm, each of the quarter wave optical thicknesses of the respective layers of the antireflective film in the design reference wavelength is obtained by dividing an optical thickness of each of the layers of the antireflective film by $\lambda_0/4$, and the optical thickness of each of the layers of the antireflective film is obtained by a product of: the refractive index of each of the layers of the antireflective film in the design reference wavelength and the physical thickness (nm) of each of the layers of the antireflective film.

2. The optical lens with an antireflective film according to claim 1, wherein each of the second layer, the fourth layer, the sixth layer, the eighth layer, and the tenth layer is one of:
a $Ta_2O_5$ layer,
an $LaTiO_3$ layer,
a layer formed of a mixture of $Ti_2O_3$ and $ZrO_2$,
a layer formed of a mixture of $ZrTiO_4$ and $ZrO_2$,
an $Nb_2O_5$ layer, or
a $TiO_2$ layer.

3. The optical lens with an antireflective film according to claim 1, wherein a maximum reflectance of the antireflective film in a wavelength range of 430 nm or more and 670 nm or less is 0.2% or less.

4. A projection lens comprising the optical lens according to claim 1.

5. A projection lens optical system comprising a plurality of optical lenses according to claim 1.

6. A projection lens optical system comprising:
a first projection lens comprising the optical lens according to claim 1;
a second projection lens comprising the optical lens according to claim 1; and
a third projection lens comprising the optical lens according to claim 1, wherein
a first refractive index of a lens substrate of the first projection lens, a second refractive index of a lens substrate of the second projection lens, and a third refractive index of a lens substrate of the third projection lens satisfy a first equation, a second equation, and a third equation, respectively, and
the first equation, the second equation, and the third equation are selected from equations (11), (12), (13), (14), (15), and (16) and are different from each other:

$$1.35 \leq n_s < 1.45; \quad \text{Equation (11)}$$

$$1.45 \leq n_s < 1.55; \quad \text{Equation (12)}$$

$$1.55 \leq n_s < 1.65; \quad \text{Equation (13)}$$

$$1.65 \leq n_s < 1.75; \quad \text{Equation (14)}$$

$$1.75 \leq n_s < 1.85; \text{ and} \quad \text{Equation (15)}$$

$$1.85 \leq n_s < 1.95. \quad \text{Equation (16)}$$

* * * * *